Figure 1:
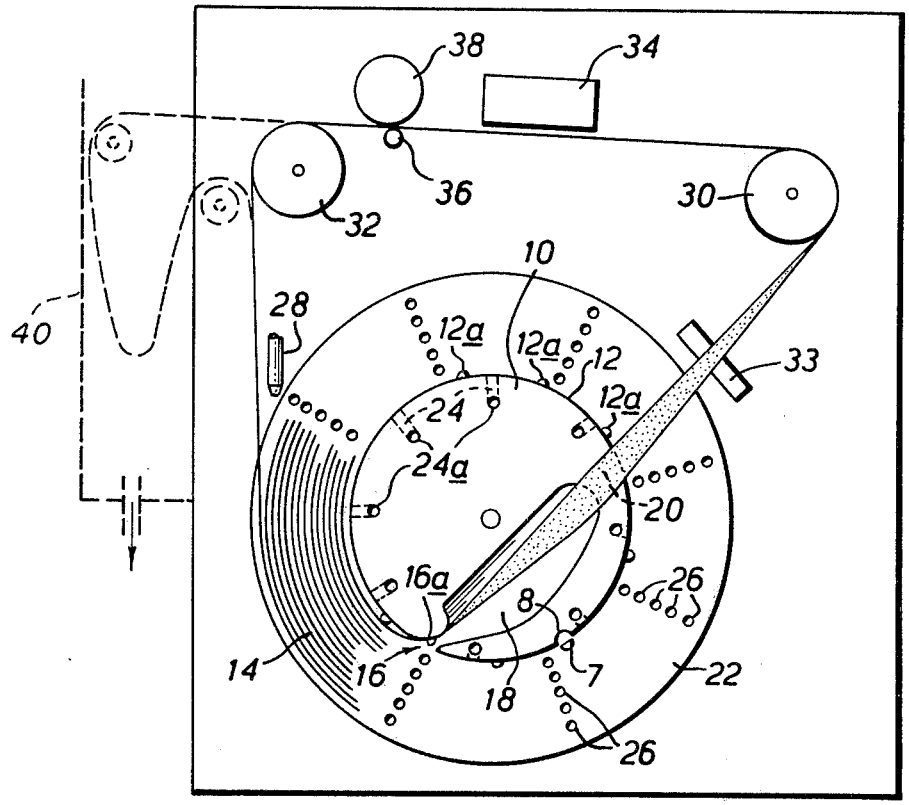

United States Patent [19]

Leshik

[11] 4,012,006
[45] Mar. 15, 1977

[54] CONTINUOUS LOOP TAPE CARTRIDGES

[75] Inventor: Edward Alexander Leshik, London, England

[73] Assignee: Hellerman Cassettes Limited, Crawley, England

[22] Filed: Sept. 30, 1975

[21] Appl. No.: 618,287

[30] Foreign Application Priority Data

Oct. 1, 1974 United Kingdom ............ 42550/74
Oct. 1, 1974 United Kingdom ............ 42553/74

[52] U.S. Cl. ...................................... 242/55.19 A
[51] Int. Cl.² ...................................... B65H 17/48
[58] Field of Search ............... 242/55.17–55.19 A, 242/68.3, 71.8; 226/95, 97; 352/126–128

[56] References Cited

UNITED STATES PATENTS

| | | | |
|---|---|---|---|
| 1,627,198 | 5/1927 | Penin | 352/128 |
| 1,926,836 | 9/1933 | Corlett | 352/126 |
| 3,281,039 | 10/1966 | Foley | 226/95 |
| 3,664,610 | 5/1972 | Sasseen | 242/210 |

*Primary Examiner*—Leonard D. Christian
*Attorney, Agent, or Firm*—Lawrence E. Laubscher

[57] ABSTRACT

A continuous-loop tape cartridge for high speed running, comprising a non-rotatively mounted tape-pack carrier having a hub around which a pack of tape is coiled, an opening in the hub wall through which in use the tape is pulled from the innermost turn of the pack, guide means for guiding the tape along a fixed path within the cartridge and back onto the pack as the outermost turn, and a duct for conveying air to the pack to provide an air-bearing for the tape at least between the innermost turn thereof and the hub.

14 Claims, 5 Drawing Figures

T→

T→

T→

T→

CONTINUOUS LOOP TAPE CARTRIDGES

BACKGROUND AND OBJECT OF THE INVENTION

This invention relates to a continuous-loop tape cartridge capable of running at high speeds. One application of the invention is to audio-recording, especially to a cartridge loaded with a master tape and used at a manufacturing station to record repeated audio programmes onto a length of tape subsequently to be divided up and put into respective cartridges or cassettes intended for use in customers' audio play-back machines. Another application of the invention is to cartridges of video tape.

A continuous-loop tape cartridge is known which comprises a housing within which a tape-pack carrier is mounted for free rotation. The carrier comprises a hub and a pack of tape is coiled around the hub. The hub is formed with a circumferential groove to enable the tape to be pulled from the innermost turn of the pack. In use the tape is pulled from the innermost turn, follows a fixed path within the cartridge and returns to the tape-pack as the outermost turn. In use, the tape-pack and the tape-pack carrier are caused to rotate by the action of pulling the tape, as described above, by a drive capstan acting directly on the tape. This known cartridge is limited as to the speed at which it can run: firstly difficulties arise at high speeds because of the high inertia and mass of the tape-pack carrier which it is necessary to rotate; secondly the tape undergoes an undesirable twisting as it leaves the innermost turn. In this and other known cartridges, the tape slides relative to surfaces, for example at the hub as it leaves the innermost turn, and large frictional forces are therefore liable to arise, particularly at high speeds.

It is an object of this invention to provide a tape cartridge for high speed running which avoids the above difficulties.

SUMMARY OF THE INVENTION

This invention provides a tape cartridge comprising a tape-pack carrier mounted non-rotatively, the carrier comprising a hub receiving the tape as a pack coiled therearound and an opening in the peripheral wall of the hub for the tape to be pulled through from the innermost turn causing the pack to rotate around the hub, guide means for guiding the tape in a continuous loop through said opening in the peripheral wall of the hub from the innermost turn of the tape-pack and back onto said pack as the outermost turn, and at least one duct for conveying air to said pack to provide an air-bearing for the tape at least between said innermost turn and the peripheral wall of the hub.

In an embodiment of tape cartridge to be described herein, a plurality of ducts is formed through the hub, opening on the peripheral wall of the hub at spaced intervals around the circumference of the hub to direct air under pressure onto the innermost turn of the pack of tape. Additionally, in the embodiment to be described, ducts are provided for directing air into one side of the tape pack to provide an air bearing between adjacent turns of the tape within the pack: in this connection it is to be noted that in use there is relative sliding movement between every pair of adjacent turns of the tape.

The embodiment to be described includes also a nozzle for directing a jet of air, tangentially of the tape pack, into the space between the outermost turn of the pack and the length of tape leading back onto the pack as the outermost turn. At running speeds air issuing from this nozzle becomes entrapped within the pack and may in some circumstances remain entrapped between every pair of adjacent turns right up to the innermost turn. It is envisaged that in some circumstances the radial air feed from the hub onto the innermost turn of the tape pack will be necessary only during the period that the tape speed is being increased from zero to maximum, the axial or tangential feed (or both together) providing sufficient air bearing during full-speed running.

DESCRIPTION

An embodiment of the invention will now be described, by way of example only, with reference to the accompanying drawings, in which:

FIG. 1 is a plan view of a tape cartridge including a tape-pack carrier loaded with an audio master tape; and FIGS. 2a – 2d show different arrangements of air feed ducts on the hub of the tape pack carrier, in respective partial side elevations of the carrier.

Referring to the drawings, there is shown a cartridge including a tape-pack carrier loaded with a one-inch audio master tape. The carrier comprises a hub 10 having a cylindrical peripheral wall 12 for receiving the magnetic tape 14, preferably lubricated, as a pack coiled around the hub. In order to load the carrier with tape, the carrier is rotated about the axis of the hub to wind on the tape. The peripheral wall is provided with an opening 16 for the tape to be pulled through from the innermost turn of the pack causing the latter to rotate around the non-rotatively mounted hub and this opening 16 should be as narrow as it is possible to manufacture. A space or cut-out 18 is provided within the hub wherein the tape twists until it lies in a plane transverse to the axis of the pack and face-to-face with a tape-bearing surface 20 which is provided on the top of the hub. The tape-pack carrier further comprises an annular flange 22 formed integral with the hub to provide a platform for supporting the lower side of the tape-pack both during the tape-loading operation and subsequently during running and conveniently this platform may have a friction-reducing coating, for example of molybdenum disulphide.

As shown, the hub 10 is formed with a plurality of radial ducts 24 opening at spaced points around the peripheral wall 12 to direct air under pressure radially onto the innermost turn of the tape. Air under pressure, typically 100 lbs./sq. inch, is fed to the ducts 24 through connecting ducts 24a open on the upper surface of the hub, as shown, or instead on the lower surface of the hub.

Figure 2A:
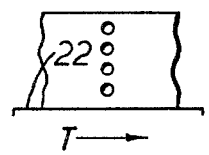
Figure 2B:
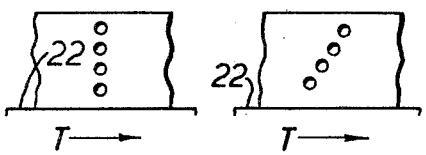
Figure 2C:
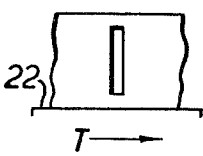
Figure 2D:
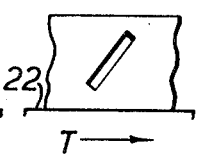

Instead of a plurality of spaced ducts 24, there may be provided a plurality of spaced-apart groups of ducts, the ducts in each group being spaced apart as a series in generally the axial direction of the hub. Such an arrangement is shown diagrammatically in FIG. 2a, where the series of ducts follows a line parallel to the axis of the hub, and also in FIG. 2b, where the series of ducts follows an inclined line, the direction of inclination being as shown relative to the direction of movement T of the tape (i.e. inclining from bottom to top of the hub in the direction T). Each such series of ducts may be replaced by an elongate slot, either parallel to the hub axis or inclined (as shown in FIGS. 2c and 2d).

The supporting flange 22 is also provided with a plurality of air feed ducts 26, these ducts extending axially of the carrier hub to feed air between adjacent turns of the pack. The ducts 26 are arranged in a plurality of groups spaced around the flange 22, each group comprising a series of ducts spaced radially. The ducts of each series may vary in size from the radially inner to the radially outer end of the series in order to provide the optimum operating characteristics. Each series of ducts may be replaced by a single slot.

An air feed nozzle 28 is provided in the cartridge to direct a jet of air tangentially of the pack into the space between the outermost turn of the pack and the length of tape leading back on to the outermost turn.

The cartridge further comprises a first bearing 30 for the tape to lead around upon leaving the tape-pack from the innermost turn and a second bearing 32 for the tape to lead around on its way to returning to the pack as the outermost turn. Each of the bearings 30, 32 may comprise a rotatable pulley or instead a fixed surface. A horizontal tape bearing surface 33 is provided to space the length of tape leaving the pack slightly above the remaining pack. In passing from the surface 33 to the surface 30 the tape twists from its substantially horizontal plane back to its vertical plane. A sensing head 34 is shown together with the usual driving capstan 36 and pressure roller 38 for the tape, although these may form part of an apparatus on which the cartridge is played rather than part of the cartridge itself.

In running use, air is fed to the tape-pack to provide an air-bearing at least between the innermost turn and the hub whilst the pack is rotated relative to the staionary hub 10 and platform 22 by being pulled from the innermost turn by the driving capstan 36. Thus, air may be fed through the radial ducts 24, the axial ducts 26 and also tangentially from nozzle 28 throughout the running use, or alternatively air may be fed through the radial ducts 24 only during start-up, particularly since the tangential feed from nozzle 28 has relatively little effect at low speeds.

The tape-pack carrier may be arranged to be separable from the rest of the cartridge, in order to change master tapes as required, the different master tapes being pre-wound on respective carriers. As one example of this, the different tapes may be carried on different tape-pack carriers each in the form of a one-piece moulded plastics cover member for fitting with the hub thereof over a hub on the cartridge, the cover member having both the hub and annular flange portions. The cartridge will in such case include air ducts for aligning with the air ducts of the hub and flange portions of the cover member. Where the cover member comprises plastics material, the tape-bearing surfaces thereof are preferably coated with a material which will improve the wear-resistance and reduce the friction-resistance of those surfaces. One suitable material is hard chrome, which may be applied to electroplating.

Additional ducts may be provided to terminate on surface 20 and 33, and also at 16a, so that a vacuum may be applied through these ducts to hold the end of the tape whilst the carrier is being rotated to wind on or load the tape. During running use, air may be blown through one or more of these ducts, especially the duct to surface 16a, to provide further air-bearing.

At least one semi-circular cut-out, e.g. 8, may be formed in the peripheral wall of the hub, to receive a correspondingly shaped pin 7 of the winding on or tape loading apparatus. During winding on the pin is rotated so that its curved surface faces radially outwards so as effectively to increase the circumference of the innermost turn of the tape-pack. After winding on, the pin or pins are rotated 180° into the cut-outs, to release the packs for running.

A vacuum column (shown in dotted outline at 40) may be provided to receive a free loop of tape between the bearing 32 and the outer turn of the tape-pack. The degree of vacuum applied would depend upon some sensed parameter, in order to control the suction force attracting the free loop down into the vacuum column and thereby stabilizing the running tension in the tape. The vacuum column may be moulded as one piece with the rest of the cartridge.

Axially extending ribs, as shown at 12a, may be formed on the hub at spaced intervals therearound, with the effect of reducing the surface area of the hub which is in contact with the inner turn of the tape.

Although the invention has been described, with reference to the drawings, in relation to a cartridge containing a one-inch audio master tape, the invention is applicable equally to cartridges of video tape. For example, cartridges of one-inch video tape may be used for action-replay for television broadcasts. Also, ¼ inch video tape, in correspondingly smaller-size cartridges, may be used for short announcements in television broadcasts.

What we claim is:

1. A tape cartridge, comprising:
  a. a base;
  b. a tape-pack carrier mounted non-rotatively on said base, said tape-pack carrier comprising a cylindrical hub projecting upwards from said base, said hub containing a recess, and an axial slot extending radially inwardly from the periphery of said hub in communication with said recess;
  c. tape-guiding means on said base;
  d. a length of tape wound as a pack around said hub, said tape passing successively off the innermost turn of said pack, through said slot, in a 90° twisted relation within said recess to a horizontal plane, and over the top of said hub and pack at a point diametrically opposite said slot, said tape then being twisted back again through 90° to a vertical plane and passing around said guiding means to return to said pack as the outermost turn thereof, said tape being in a continuous loop; and
  e. at least one radial duct extending through said hub to the cylindrical peripheral surface thereof, to convey air to said pack to provide an air-bearing for the tape at least between said innermost turn and said cylindrical surface of said hub.

2. A cartridge as claimed in claim 1, including a series of said ducts which open on said cylindrical surface of the hub at points spaced apart generally in the axial direction of the hub.

3. A cartridge as claimed in claim 1, in which the opening of said duct on said cylindrical wall comprises an elongate slot extending generally in the axial direction of the hub.

4. A cartridge as claimed in claim 2, in which the opening points of said series of ducts follow a line inclined to the axis of said hub.

5. A cartridge as claimed in claim 3, wherein said elongate slot is inclined relative to the axis of said hub.

6. A cartridge as claimed in claim 1, comprising a plurality of said ducts opening onto said cylindrical surface at points spaced apart fround the circumference of said hub.

7. A cartridge as claimed in claim 1, comprising an annular flange extending radially from said hub to support one side of the tape pack, said flange containing at least one duct, and means for directing air as a jet through said duct against the adjacent side of the tape pack, thereby to provide an air bearing between adjacent turns of the tape within said pack.

8. A cartridge as claimed in claim 7, comprising a series of said ducts formed through said flange and spaced apart in the radial direction of said flange.

9. A cartridge as claimed in claim 7, in which said duct formed through said flange opens on the surface of said flange as a slot elongated in the radial direction of said flange.

10. A cartridge as claimed in claim 7, comprising a plurality of said ducts formed through said flange and spaced at intervals around said flange.

11. A cartridge as claimed in claim 1, wherein said tape pack carrier is formed as a one-piece cover member formed of synthetic plastic material and removably mounted with its hub disposed over a fixed hub of the tape cartridge and with the duct of the carrier aligned to receive air from a corresponding duct formed within the tape cartridge.

12. A cartridge as claimed in claim 11, in which the tape running surfaces of the carrier are coated with a material which improves the wear-resistance and reduces the frictional resistance of the plastics material of which the carrier is formed.

13. A cartridge as claimed in claim 1, in which the hub thereof is provided with a plurality of ribs spaced apart around the hub and extending axially of the hub to reduce the surface area of the hub which contacts the innermost turn of the tape pack.

14. A cartridge as claimed in claim 1, further comprising a nozzle for directing air, as a jet, tangentially of the tape pack into the space between the outermost turn of the pack and the length of tape leading back onto the pack as the outermost turn.

* * * * *